T. J. BELFRANCI.
SEWAGE TREATMENT PLANT.
APPLICATION FILED AUG. 3, 1915.

1,163,058. Patented Dec. 7, 1915.

Inventor,
T. J. Belfranci,
By Francis M. Wright
Attorney

UNITED STATES PATENT OFFICE.

THOMAS J. BELFRANCI, OF OROVILLE, CALIFORNIA, ASSIGNOR OF ONE-HALF TO MARIE C. BELFRANCI, OF OROVILLE, CALIFORNIA.

SEWAGE-TREATMENT PLANT.

1,163,058.

Specification of Letters Patent.

Patented Dec. 7, 1915.

Application filed August 3, 1915. Serial No. 43,396.

*To all whom it may concern:*

Be it known that I, THOMAS J. BELFRANCI, a citizen of the United States, residing at Oroville, in the county of Butte and State of California, have invented new and useful Improvements in Sewage-Treatment Plants, of which the following is a specification.

The object of the present invention is to provide an apparatus for the conversion of sewage into innocuous sludge and comparatively clean water by means of bacteria, which will be simple and economical, convenient and durable in use, well adapted for installation in farms, country schoolhouses and small communities, and can be readily added to as the size of the community increases.

Figure 1:
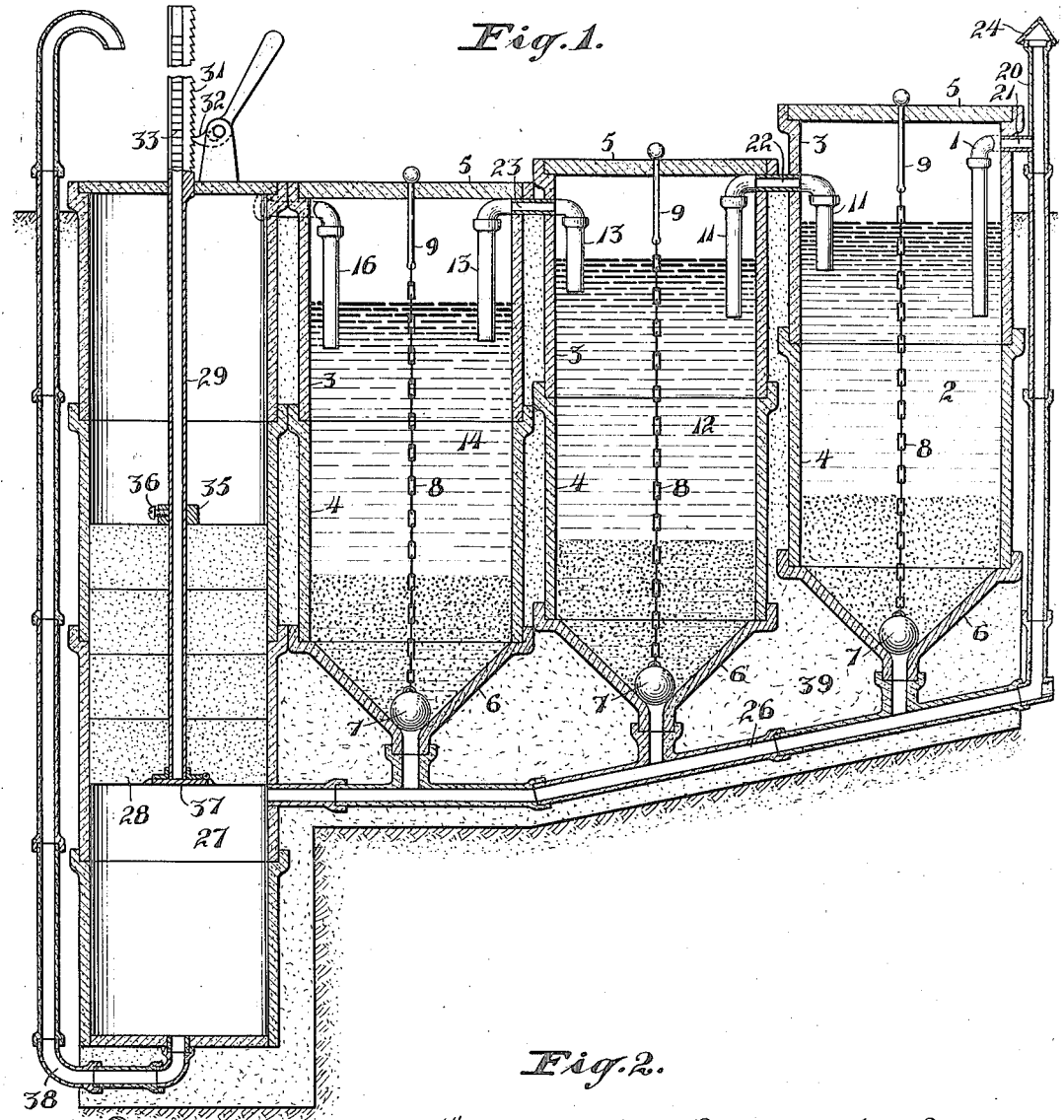
Figure 2:
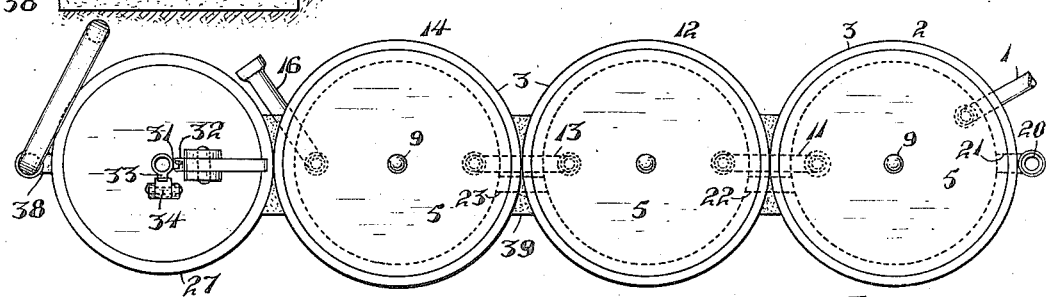

In the accompanying drawing, Figure 1 is a vertical longitudinal section of my improved apparatus; Fig. 2 is a plan view thereof.

Referring to the drawing, 1 indicates an inlet pipe which conveys the sewage to a settling tank 2, being the first of a series of tanks or receptacles. All the tanks of the series are constructed in general in the same manner and each comprises two sections 3, 4 of large sewer pipe of diameter 24 inches, 30 inches or 36 inches, as required. Each section is 2½ feet in height and the small end of the upper section 3 fits into the bell-shaped end of the lower section 4 and is cemented thereto. A cover 5 is in like manner cemented into the bell-shaped upper end of the upper section. The lower end of the lower section is in like manner cemented into the bell-shaped upper end of a funnel-shaped bottom section 6, the outlet from which is closed by a glass ball valve 7, to which is attached the lower end of a chain 8, the upper end of which is connected to a rod 9 extending snugly through a central hole in the cover 5.

The acids generated by the action of the bacteria on the sewage have a very destructive effect upon material of which ordinary containers are constructed. For this reason I form the bodies of the tanks or receptacles of sewer pipe, which is glazed both inside and outside, and the cover and bottom section are formed of like material. Moreover, to connect the sections together, I use a cement which is very resistant to the action of acids and is absolutely watertight. It consists of quartz sand, Portland cement, alum and soft soap. The alum, quartz sand and Portland cement are mixed together, but instead of adding plain water to make the cement I use water in which the soft soap has been dissolved. However, for securing the covers to the tanks, I use any suitable readily friable cement, such as a mixture of asphaltum and sand, since it is necessary occasionally to remove the cover.

From a mediate level in the settling tank 2 the liquid contents thereof are siphoned by a siphon 11 into a liquid tank 12 which is similar to the tank 2, but at a slightly lower level; and from the receptacle 12 in like manner the liquid contents are siphoned off by a siphon 13 into a precisely similar purifying tank 14 at a still lower level. From said tank 14 the liquid can escape by a discharge outlet 16. The liquid is drawn off by means of siphons from one tank to the next rather than by an ordinary conduit communicating with both at the same level for the reason that it is desirable to draw off the liquid at a depth of one foot or more below the surface, a scum floating on the top of the liquid to a depth of six inches or more in which the bacteria are at work. It is not desirable to disturb the active region of the bacteria.

It is obvious that, as the sewage is added from time to time to the tank 2, the solids therein will precipitate to the bottom of said tank, forming sludge, while the level of the liquid will rise therein until the top of the siphon 11 is reached, when the liquid, containing a small portion of the solids still remaining in suspension, will flow over into the tank 12. In this receptacle in like manner the solids will again precipitate, the now almost pure liquid rising to the top of the siphon 13, when the liquid will again siphon down to the bottom of the siphon 13 and into the tank 14. In this latter tank, the solids will again precipitate, until the liquid which escapes is practically free from solid matter.

20 indicates an open-topped stack rising to a sufficient height above the level of the tanks and communicating with the interiors thereof by conduits 21, 22 and 23, to allow of the escape of gas from said tanks into said stack and then into the open air. The top of the stack is covered by a hood 24.

The outlet from the funnel-shaped bottom section of each receptacle is connected with a conduit 26, sloping downwardly at the some inclination as the series of tanks, which conduit enters a pump chamber 27, in which is a plunger 28 which is normally held in an elevated position by means of a pipe 29 attached thereto connected above the top of the chamber with a rack 31 adapted to be engaged by a lever 32, another rack 33 being held by a pawl 34. The plunger 28 is preferably made of disks of concrete having central apertures through which the pipe 29 passes, said disks being held rigidly to the pipe by means of a collar 35 secured by a set screw 36.

At long intervals, as for instance, six months or a year, it may be desirable to discharge the contents of the apparatus. For this purpose, the valves are raised and the sludge precipitated to the bottoms of the tanks 2, 12 and 14 is allowed to flow through the conduit 26 into the bottom of the pump chamber 27, below the plunger 28. On withdrawing the latch, the plunger is allowed to descend and in so descending a valve 37 at the bottom of the pipe 29 is closed, so that the plunger forces the sludge in the chamber 27 into a pipe 38 leading from the center of the bottom of said chamber and discharging at any suitable height. However, it will not usually be necessary to empty all the tanks at the same time, the settling tank 2 requiring to be emptied more frequently than the others since there is a greater precipitation of solids therein.

The bottom sections of the tanks and the bottom of the pump chamber are inclosed in concrete, as shown at 39, which forms a bond between the several tanks and the pump chamber.

I claim:—

1. The combination of a closed settling tank, a closed liquid tank and a closed purifying tank all formed of material which can not be acted upon by the acids produced by bacteria in sewage, readily friable cement connecting each tank to its closure, waterproof and acid-proof cement connecting the remaining joints of the tank, siphons connecting said tanks in series, and means for disposing separately of the sludge and liquids in said tanks.

2. The combination of an inclined series of closed tanks, siphons connecting said tanks in series, a pump chamber, a plunger therein, conduits leading from said tanks to the pump chamber, a valve controlling each conduit, and an upwardly leading outlet conduit from said pump chamber.

3. The combination of an inclined series of closed tanks, siphons connecting said tanks in series, a pump chamber, sludge conduits leading from said tanks to the pump chamber, a valve controlling each conduit, an upwardly leading outlet conduit from said pump chamber, and a plunger in said pump chamber of sufficient weight to force the sludge to the top of said outlet conduit.

4. The combination of an inclined series of closed tanks, siphons connecting said tanks in series, a vent stack communicating with all of said tanks and leading upwardly above the same, a pump chamber, a plunger therein, conduits leading from said tanks to the pump chamber, a valve controlling each conduit, and an upwardly leading outlet conduit from said pump chamber.

5. The combination of an inclined series of closed tanks formed of material which can not be acted upon by the acids produced by bacteria in sewage, readily friable cement connecting each tank to its closure, waterproof and acid-proof cement connecting the remaining joints of the tank, and siphons connecting said tanks in series.

In testimony whereof I have hereunto set my hand in the presence of two subscribing witnesses.

T. J. BELFRANCI.

Witnesses:
 FRANCIS M. WRIGHT,
 G. M. BALL.